Patented July 25, 1933

1,919,752

UNITED STATES PATENT OFFICE

OTTO SCHMIDT AND OTTO GROSSKINSKY, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

SEPARATION OF MIXTURES BY DISTILLATION

No Drawing. Application filed October 11, 1928, Serial No. 311,956, and in Germany March 19, 1927.

This invention is a continuation in part of the invention described and claimed in Patent No. 1,832,428, which relates to a process of fractional distillation under elevated pressure for the separation of mixtures of gaseous or low boiling point unsaturated hydrocarbons, if required, after liquefaction, into their components.

We have now found that mixtures of other substances of low boiling point, either alone or together with hydrocarbons of low boiling point may be separated into their components by fractional distillation, the volatility of either all or some of the components of the mixture having been reduced. The reduction of volatility may be effected either by the application of pressure or by the addition, prior to or during the distillation, of substances which lower the vapor tension of one or more of the substances to be separated.

The process of fractional distillation under pressure may, for example, be employed for obtaining ethers, esters and the like of low boiling point in a pure state from mixtures containing the same. Examples of such ethers, esters and the like coming into question for the purposes of the present invention are methyl ether, ethyl ether, ethylene oxid, propylene oxid, methyl formate, methyl chlorid, ethyl chlorid and the like.

It is often advantageous in the process of fractional distillation under pressure according to the present invention, in particular when mixtures of low boiling point are employed, to add liquids having a higher boiling point, for example, hydrocarbons of higher boiling point than that of the materials to be separated. In this case hydrocarbons may be employed also as initial materials. Thus for example in the separation of mixtures of methane, ethylene and propylene into their constituents by distillation under pressure, it is necessary to add pentane. If it is not desired to separate the substances of very low boiling point such as hydrogen, methane and nitrogen into their constituents, but to obtain the substances of somewhat higher boiling point, for example, ethylene in a substantially pure state, this result may be obtained without operating below the liquefaction temperature of the said substances of higher boiling point by employing an addition of solvents for the said substances.

As regards the reduction of the volatility by the addition prior to distillation of substances which lower the vapor tension of one or more of the substances to be separated, we have found that this method of working is applicable for the separation of mixtures of substances with closely adjacent boiling points, as well as such mixtures as are liquid at ordinary or reduced pressure, also those which can be liquefied only under increased pressure and in particular of mixtures of substances having a different degree of saturation. The fractional distillation in the presence of the said additions can be effected under ordinary, elevated or reduced pressure. Substances particularly suitable as additions according to the process of the present invention are for example, such having a particular affinity to unsaturated hydrocarbons, inasmuch as these latter are readily absorbed in the said substances. These comprise, more especially, such organic solvents as have high dielectric constants and, at the same time, contain one or more oxygen, nitrogen or halogen atoms in the molecule. The organic compounds employed may contain, for example, hydroxyl or acyl or aldehyde or alkoxyl groups or halogen atoms or several of these radicles. Typical examples of these substances are ethylene chlorhydrin, glycol mono-acetate or di-acetate, glycol monomethyl ether, glycerol, di- or tri-acetate, lactic acid nitril, diethyl-tartrate, furfurol and the like. Aromatic bases, such as aniline, toluidine, phenylhaydrazine and the like are also applicable. All of these said solvents when added for example to a mixture of butadiene and butylene have the property of forming two layers, the lower one consisting of butadiene and the solvent, whereas the butylene is contained in the upper layer.

If one of the said agents is added to a mixture of, for example, hexamethylene and benzene, and distillation is effected under ordinary pressure, only the saturated compound, in this case the hexamethylene, passes over at first, and a practically complete separation of the benzene from the hexamethylene is effected. This method of working is applicable to numerous other mixtures, such as frequently occur in the arts. For example, crude fractions of coal tar, or brown coal tar, varieties of petroleum, the mixtures obtained by the hydrogenation of carbonaceous substances, and the like can be very simply and easily separated according to this method of working, by distilling off the paraffins and cycloparaffins of the several fractions, and leaving the aromatic hydrocarbons behind in the residue. Other unsaturated compounds of all kinds, such as nitro compounds, nitriles, carboxylic esters and the like can be separated from hydrocarbons and the saturated compounds according to the method herein described.

Alcohols, for example, may be easily freed from other substances by adding bases, especially secondary or tertiary bases, to the mixture to be separated. Thus, for example, the alcohols of the cyclohexane series furnish, with secondary or tertiary bases, solid crystalline molecular compounds in which the alcohols have a very low vapor pressure. Cyclohexanol furnishes with dicyclohexylamine a well defined compound

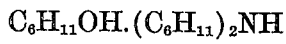

with the melting point of 58° C. If dicyclohexylamine be added to a mixture of cyclohexanol with other substances, such as phenetol, the unsaturated phenetol can be distilled off, and on the other hand by adding glycerol diacetate to a mixture of phenetol and cyclohexanol, the cyclohexanol is readily separated by distillation.

The following examples will further illustrate the nature of the said invention, but the invention is not restricted to these examples. The parts where not otherwise specified are by weight.

*Example 1*

A mixture composed of 80 parts of cyclohexane and 20 parts of benzene which cannot be separated by distillation, is mixed with 70 parts of ethylenechlorhydrin and subjected to fractional distillation in a column several meters in height. With a working pressure of about 100 millimeters mercury gauge and at about 25° C., a cyclohexane practically free from benzene is obtained. The benzene remains in solution in ethylenechlorhydrin in the still residue.

*Example 2*

A mixture consisting of 70 per cent of isoprene, boiling point 35° C., and 30 per cent of n-pentane, boiling point 36° C., is mixed with its own weight of glycol diacetate and distilled. The pentane is obtained in the first runnings, whilst the later fractions contain pure isoprene.

*Example 3*

10 kilograms of crude butadiene containing about 85 per cent of butadiene having a boiling point of 5° C. below zero and 15 per cent of alpha-butylene having a boiling point of 6° C. below zero are filled into a pressure still, having a volume of about 25 liters, together with 5 kilograms of ethylene chlorhydrin and are subjected to distillation under pressure. At about 50° C. and under a pressure of 5 atmospheres a first running consisting mainly of alpha-butylene besides butadiene is obtained and thereupon further fractions pass over consisting of 98 per cent of butadiene, which is practically free from butylene.

*Example 4*

100 kilograms of crude dimethyl-ether containing about 10 per cent of water and methyl alcohol are heated in a still fitted with a pressure fractionating column of about 4 meters in height, the pressure being maintained at about 8 atmospheres. At 40° C. a product distils over boiling within the range of 1° C., which consists of pure dimethyl ether. About 10 kilograms of a residue remain in the retort, and their is practically no loss of dimethyl ether.

What we claim is:—

1. A process for the separation into its constituents of a mixture of hydrocarbons of different degrees of saturation which comprises adding to said mixture an organic liquid having a higher boiling point than said mixture, characterized by the property of separating a liquid mixture of butadiene and butylene into two layers, the upper being butylene and the lower butadiene and said organic liquid, and selected from the class consisting of ethylene chlorhydrin, esters of aliphatic acids, furfurol, nitriles and organic bases and removing the constituents of the mixture not dissolved by said organic liquid by distillation.

2. A process for the separation into its constituents of a mixture of hydrocarbons of different degrees of saturation which comprises adding to said mixture an organic liquid having a higher boiling point than said mixture, characterized by the property of separating a liquid mixture of butadiene and butylene into two layers, the upper being butylene and the lower butadiene and said organic liquid, and selected from the class consisting of ethylene, chlorhydrin, esters of aliphatic acids, furfurol, nitriles and organic bases and removing the constituents of the mixture not dissolved by said organic liquid by distillation under pressure.

3. A process for the separation into its constituents of a mixture of olefines and diolefines of low boiling point which comprises adding to said mixture an organic liquid having a higher boiling point than said mixture, characterized by the property of separating a liquid mixture of butadiene and butylene into two layers, the upper being butylene and the lower butadiene and said organic liquid, and selected from the class consisting of ethylene, chlorhydrin, esters of aliphatic acids, furfurol, nitriles and organic bases and removing the constituents of the mixture not dissolved by said organic liquid by distillation under pressure.

4. A process for the separation into its constituents of a mixture of olefines and diolefines of low boiling point which comprises adding to said mixture an organic liquid having a higher boiling point than said mixture, characterized by the property of separating a liquid mixture of butadiene and butylene into two layers, the upper being butylene and the lower butadiene and said organic liquid, and selected from the class consisting of ethylene, chlorhydrin, esters of aliphatic acids, furfurol, nitriles and organic bases and removing the constituents of the mixture not dissolved by said organic liquid by distillation.

5. The process for the separation into its constituents of a mixture of a diolefine and a hydrocarbon of a higher degree of saturation which comprises adding to said mixture an organic liquid having a higher boiling point than said mixture, characterized by the property of separating a liquid mixture of butadiene and butylene into two layers, the upper being butylene and the lower butadiene and said organic liquid, and selected from the class consisting of ethylene chlorhydrin, esters of aliphatic acids, furfurol, nitriles and organic bases and removing the constituents of the mixture not dissolved by said organic liquid by distillation.

6. A process for the separation into its constituents of a mixture of olefines and diolefines of low boiling point, which comprises adding ethylene chlorhydrine to the mixture and removing the constituents of the mixture not dissolved by said ethylene chlorhydrine by distillation.

7. A process for the separation into its constituents of a mixture of olefines and diolefines of low boiling point which comprises adding to the mixture an ester of an aliphatic acid having a higher boiling point than the mixture to be separated, and removing the constituents of the mixture not dissolved by said ester by distillation.

8. A process for the separation into its constituents of a liquid mixture of butadiene and alpha-butylene, which comprises adding ethylene chlorhydrin to the mixture, and removing the constituents of the mixture not dissolved by said ethylene chlorhydrine by distillation under pressure.

OTTO SCHMIDT.
OTTO GROSSKINSKY.